US007503209B2

(12) United States Patent
Platt et al.

(10) Patent No.: US 7,503,209 B2

(45) Date of Patent: Mar. 17, 2009

(54) TIMING DEVICE FOR INTERNAL COMBUSTION ENGINE

(75) Inventors: Richard Booth Platt, Grosse Pointe Farms, MI (US); Rick Anthony Hobbs, Sterling Heights, MI (US)

(73) Assignee: Specialty Auto Parts U.S.A., Inc., Warren, MI (US)

( * ) Notice: Subject to any disclaimer, the term of this patent is extended or adjusted under 35 U.S.C. 154(b) by 168 days.

(21) Appl. No.: 11/379,468

(22) Filed: Apr. 20, 2006

(65) Prior Publication Data

US 2007/0245816 A1 Oct. 25, 2007

(51) Int. Cl.
*G01M 15/00* (2006.01)

(52) U.S. Cl. .................................................... 73/117.2

(58) Field of Classification Search .................. 73/116, 73/117.2, 117.3, 118.1, 112, 119 R
See application file for complete search history.

(56) References Cited

U.S. PATENT DOCUMENTS 2,837,713 A 6/1958 Schoenleber
3,693,148 A * 9/1972 Pittman ................... 340/425.5
4,072,891 A 2/1978 Campbell
4,177,781 A 12/1979 Marchelletta et al.
4,423,624 A * 1/1984 Dooley et al. ............. 73/119 A
4,441,021 A * 4/1984 Olson et al. ............ 250/227.11
4,484,469 A * 11/1984 Grover et al. ............. 73/119 A
4,489,498 A 12/1984 Christophersen
4,506,546 A * 3/1985 Olson et al. ............... 73/119 A
RE34,211 E * 4/1993 Kuroiwa et al. ............... 73/116
5,431,134 A 7/1995 Budde et al.
5,610,327 A * 3/1997 Becker et al. .............. 73/117.3
6,301,957 B1 * 10/2001 Sakaguchi et al. ......... 73/117.3
6,388,446 B1 5/2002 Nielsen et al.
2006/0113999 A1 * 6/2006 Brothers et al. ............. 324/391

FOREIGN PATENT DOCUMENTS

JP 355058403 A 5/1980
JP 404109058 A 4/1992

* cited by examiner

*Primary Examiner*—Eric S McCall
(74) *Attorney, Agent, or Firm*—Jerome R. Drouillard; Dickinson Wright PLLC

(57) ABSTRACT

A stroboscopic timing device for an internal combustion engine includes a switchable light source having a light emitter and a base for mounting the light source on an exterior surface of an engine adjacent to a rotating shaft such as a camshaft or a crankshaft. A power source and trigger circuit are operatively associated with the light source, and at least the trigger circuit is enclosed within a housing mounted to the base. A sensor, which is removeably cabled to the switchable light source, triggers energization of the light source when a predetermined engine operating condition, such as a spark voltage, is detected.

20 Claims, 5 Drawing Sheets

TIMING DEVICE FOR INTERNAL COMBUSTION ENGINE

BACKGROUND OF THE INVENTION

The present invention relates to a timing device having a switchable light source for stroboscopically illuminating a rotating engine part, such as a crankshaft damper, in response to a signal from either an ignition system component, such as a sparkplug lead, or from another sensor, which could, for example, be a pressure sensor associated with a fuel injection system. The timing signal could alternatively originate from other components having a periodic characteristic corresponding to an engine operating parameter. The stroboscopic illumination produced by the present device permits an engine function to be timed with respect to the rotational position of an engine's crankshaft, camshaft, or other rotating part.

Timing lights have been used with sparked-ignited automotive engines for many decades. Such lights typically are hand-held devices powered by the engine's electrical system, (usually operating at twelve volts) and use an inductive pickup to trigger a neon light. Such timing lights suffer from the drawback that they are generally hand-held, thereby leaving the light's operator with only one free hand to adjust the engine. This situation is of moderate consequence for operators of ordinary production engines, because ignition timing is usually set while the engine is idling.

High performance engine applications present a different set of requirements regarding spark timing. With high performance engines, it is frequently desirable to determine total spark advance, and this is done only after opening the throttle so as to increase the engine speed. Of course, this requires one hand to rotate the distributor, and one hand to advance the throttle, leaving no means for handling a conventional timing light.

Hand-held timing lights suffer from an additional disadvantage because they are subject to damage from rotating machinery associated with the front end accessory drives of engines, such as a cooling fan. Hand-held timing lights also subject the operator to a risk of becoming entangled in the engine's drive belts. A timing device according to the present invention allows hands-free operation, and is useful for not only spark-ignited engines, but also diesel engines and other types of reciprocating internal combustion engines.

SUMMARY OF THE INVENTION

A timing device for an internal combustion engine includes a switchable light source having a light emitter for mounting to an exterior surface of an engine, and a sensor for providing a switching signal to the switchable light source. A base allows the light emitter to be mounted to an exterior surface of an engine, and a light guide mounted to the base directs light emanating from the switchable light source. This allows the light guide to cast its shadow upon a rotating shaft such as a camshaft or a crankshaft, and more particularly, upon a crankshaft damper. The present light source also includes a housing containing the light emitter and a trigger circuit, with the housing being mounted to the base for securing the housing to an exterior surface of an engine. The energy source for powering the switchable light source may include a conductor for connecting the switchable light source with a source of electrical energy, such as a vehicle battery, or an electrical outlet. Alternatively, in a preferred embodiment the source of electrical energy is at least one battery located within the housing of the switchable light source.

According to another aspect of the present invention, a sensor used with the present timing device may be either an inductive sensor for sensing a firing pulse within a sparkplug lead, or a pressure sensor for sensing an injection pulse within a fuel injector supply line, or yet other types of sensors used for monitoring engine operating parameters and known to those skilled in the art and suggested by this disclosure. The sensor may be removably cabled to the switchable light source to allow the switchable light source to remain mounted upon an exterior surface of an engine, while allowing the sensor to be removed for safekeeping when the switchable light source is not being employed to verify engine timing.

According to another aspect of the present invention, a light emitter incorporated in the present device may comprise either a light emitting diode or a laser, such as a ruby laser, or yet other switchable, electrically powered, light sources.

It is an advantage of a timing device according to the present invention that engine timing may be checked with the convenience of hands-free operation of the timing device.

It is a further advantage of a timing device according to the present invention that this device may be used with not only with spark-ignited engines, but also fuel-injected engines requiring timing of injection events.

It is a further advantage according to the present invention that the present timing device may be mounted to the engine, thereby obviating the need for storing the entire device within a toolbox, and freeing the operator of a vehicle from the necessity of carrying around a bulky timing light.

It is another advantage of a device according to the present system that the device may be self-powered, eliminating the need for leads attached to a vehicle's electric power supply. This is particularly useful with certain diesel engines operating without a conventional electrical system.

It is yet another advantage of a device according to the present invention that the device may be safely employed because the operator of the present timing device need not place himself in close proximity to rotating machinery located within the front end accessory drive of an engine. In effect, the operator has more freedom to select a position from which the timing may be more easily adjusted.

It is yet another advantage of a device according to the present invention that the housing containing the light emitter may be relocated to another engine, while leaving the attaching bracketry attached to a first engine.

It is yet a further advantage of a device according to the present invention that the compact size of this device requires less material for its construction, as compared with conventional ignition timing lights.

Other advantages, as well as features and objects of the present invention, will become apparent to the reader of this specification.

DETAILED DESCRIPTION OF THE PREFERRED EMBODIMENTS

Figure 1:
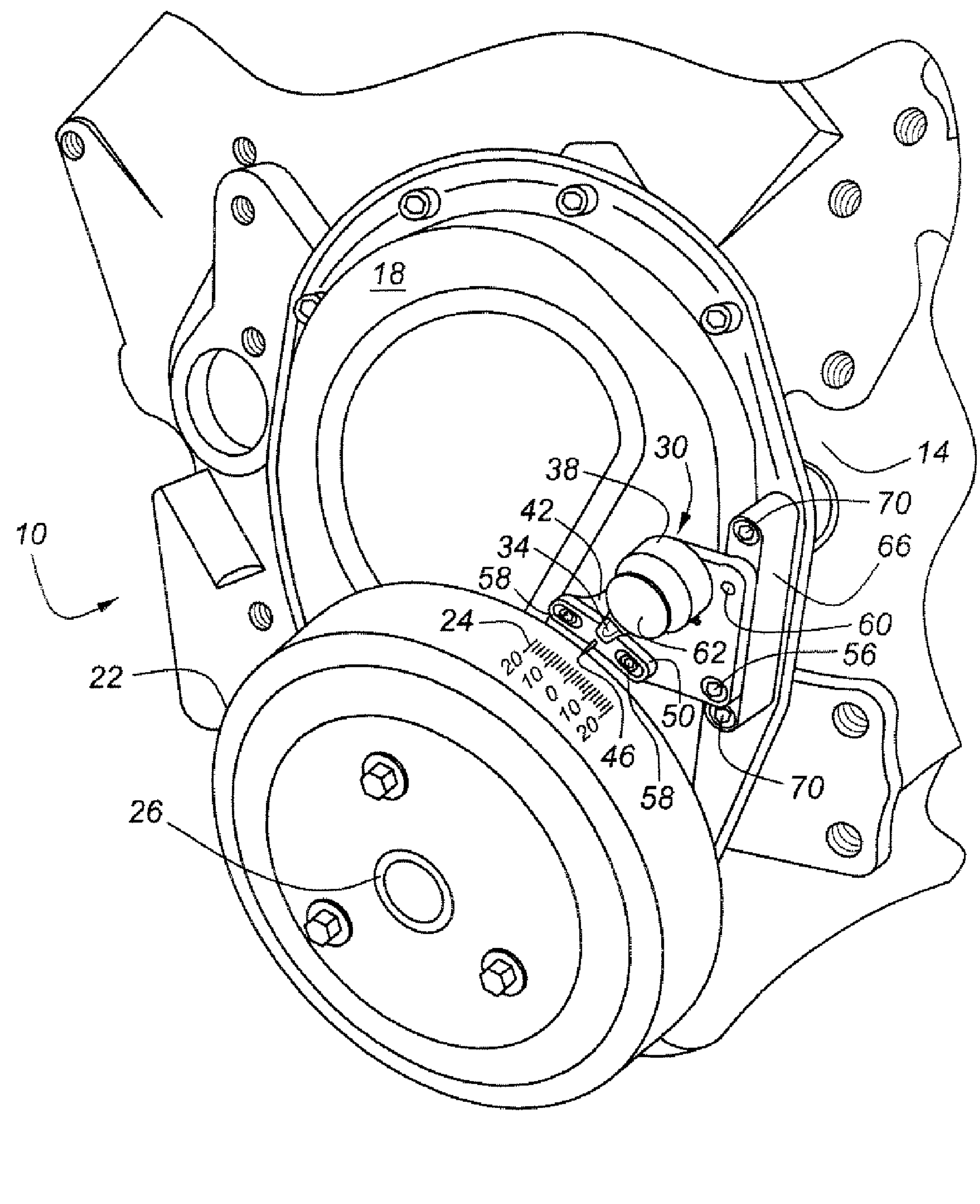
FIG. 1 is a partial perspective view of an engine having a mounted timing device according to one aspect of the present invention.

As shown in FIG. 1 engine 10 has cylinder block 14 and timing cover 18, which encloses either timing gears or a timing chain and sprockets (not shown). Crankshaft damper 22 is applied to crankshaft 26. Damper 22 is locked rotationally to crankshaft 26 and rotates whenever engine 10 is operating. Damper 22 has a number of degree markings, 24, inscribed thereupon, which allow the ignition or fuel injection timing of engine 10 to be set by means of stroboscopic light provided by switchable light source 30 according to the present invention. FIG. 1 also shows light emitter 34, which projects from a generally circular housing, 38, attached to a base, 42, which is supported by a spacer, 66. Base 42 is attached to spacer 66 by means of screw 56 and locating pin 60 (see also FIGS. 2 and 3). Base 42 and spacer 66 are maintained upon an exterior surface of engine 10 in the vicinity of timing cover 18 by means of screws 70. Once screws 70 have been fully driven, switchable light source 30 will be maintained upon engine 10 until removed by a technician or other vehicle operator.

FIG. 1 also shows timing pointer 46, which is attached to a pointer base, 50, by means of screws 58.

Figure 2:
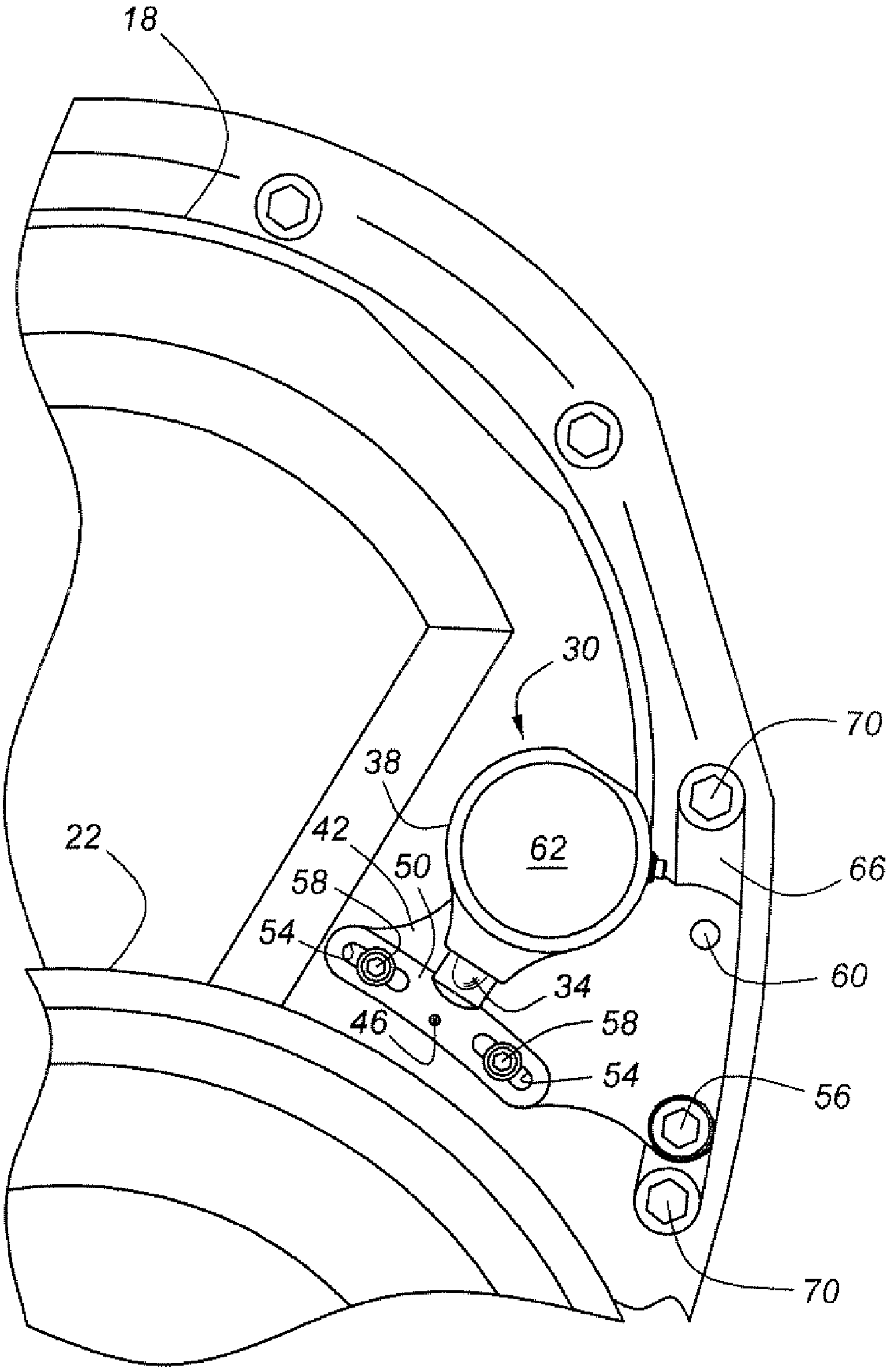
FIG. 2 is a partial plan view of the timing device and engine of FIG. 1.

FIG. 2 shows more clearly pointer base 50, pointer 46, screws 58 and switchable light source base 42. The position of pointer 46 may be adjusted by loosening screws 58 and by allowing screws 58 to move within slots 54 as pointer base 50 is moved with respect to base 42. Cover 62, which is threaded upon housing 38, is also clearly shown in FIG. 2. As seen in FIG. 2, when light emitter 34, which may be either an LED, or a laser, or other type of visible electromagnetic radiation emitter, fires, the shadow of pointer 46 falls upon that portion of crankshaft damper 22 having degree markings 24. This stroboscopic illumination permits the ignition or fuel injection timing of engine 10 to be checked and adjusted.

Figure 3:
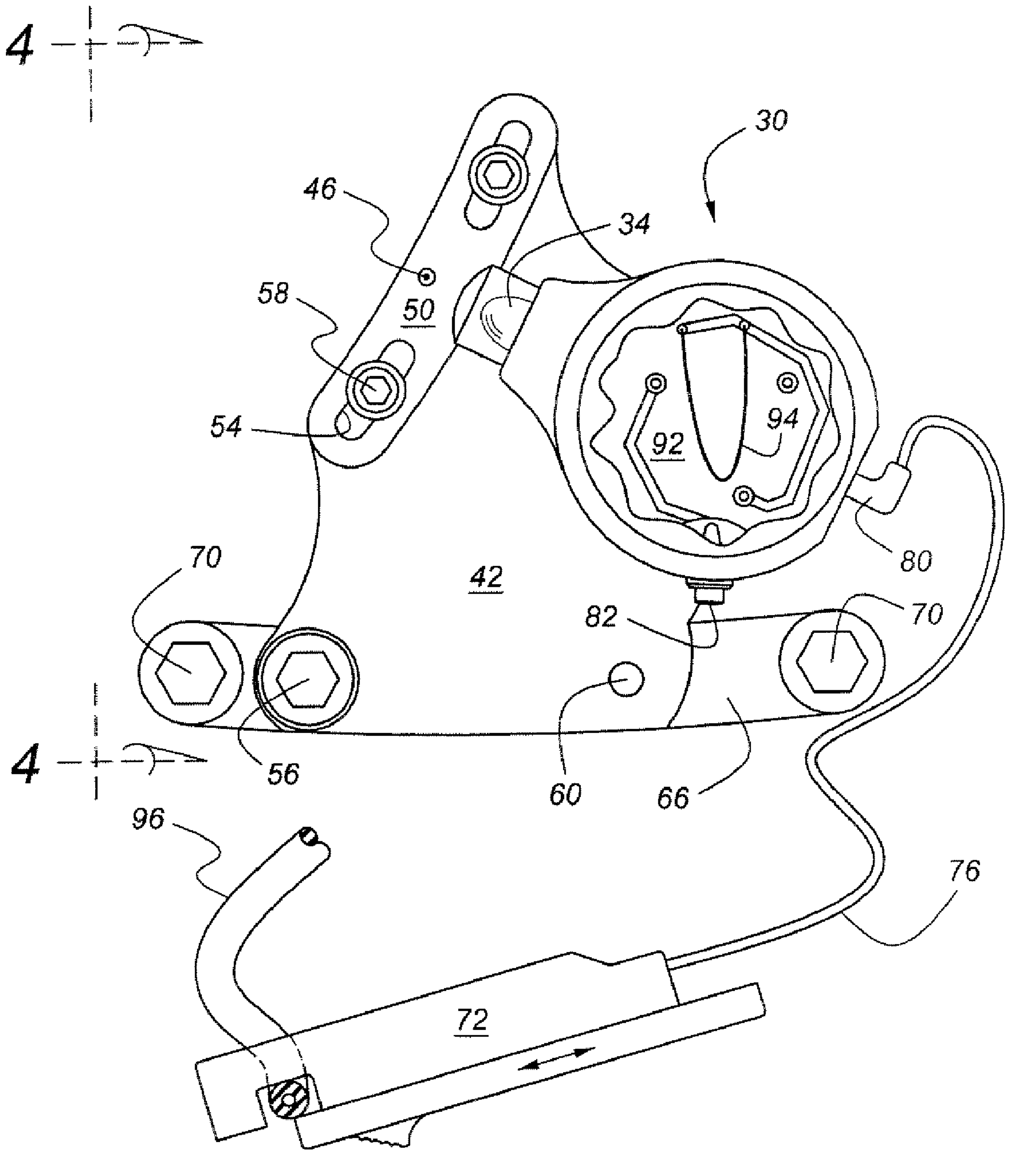
FIG. 3 is a plan view of a timing device according to the present invention.
Figure 4:
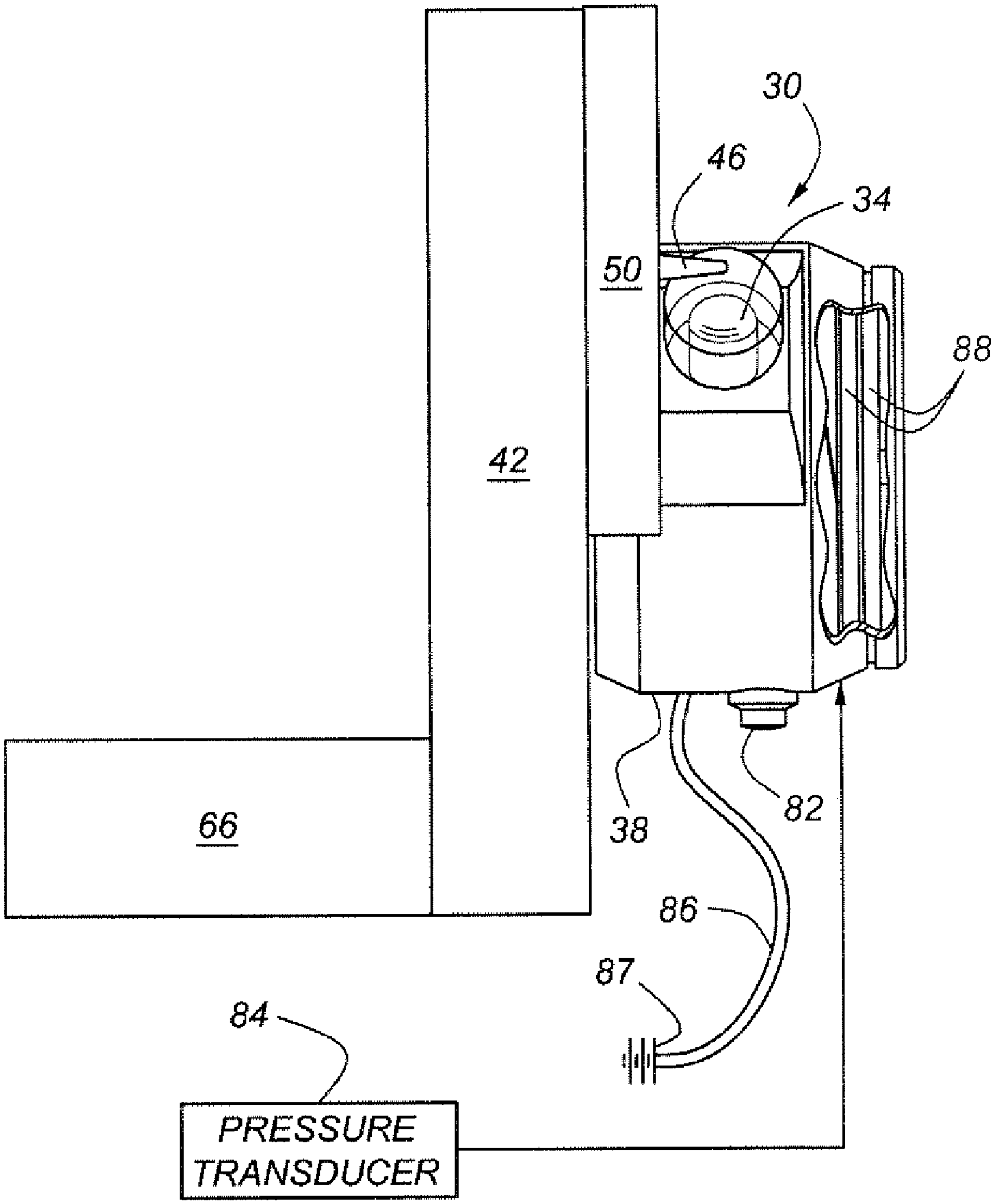
FIG. 4 is a side elevation of the present timing device, taken along the line 4-4 of FIG. 3.

FIG. 3 includes a first type of sensor suitable for use with the present invention. Inductive pickup 72, is removably cabled by means of cable 76 and connector 80 to switchable light source 30. Inductive pickup 72 is shown as having been placed about sparkplug lead or wire 96 so that when a firing voltage travels along wire 96, light emitter 34 will be triggered by means of a circuit applied to circuit board 92, which is powered either by an external cable 86, connected to vehicle battery 87 (FIG. 4), or by batteries 88, contained within housing 38 (FIG. 4). Batteries 88 make contact with a loop contactor, 94 mounted to circuit board 92. The precise details of the trigger circuit mounted upon circuit board 92 are conventional, whether a device according to the present invention uses an LED, a laser, or another light emitter known to those skilled in the art and suggested by this disclosure. This detail is committed to those wishing to employ the present inventive timing device. In any event, batteries 88 will have a long life because power will be consumed only when light emitter 34 fires.

FIG. 4 illustrates a second type of sensor, in this case, pressure transducer 84, which may be employed to collect a pressure signal from a fuel injection line (not shown). This will allow timing of certain fuel injection pumps in a manner similar to the timing of a spark ignition engine.

Figure 5:
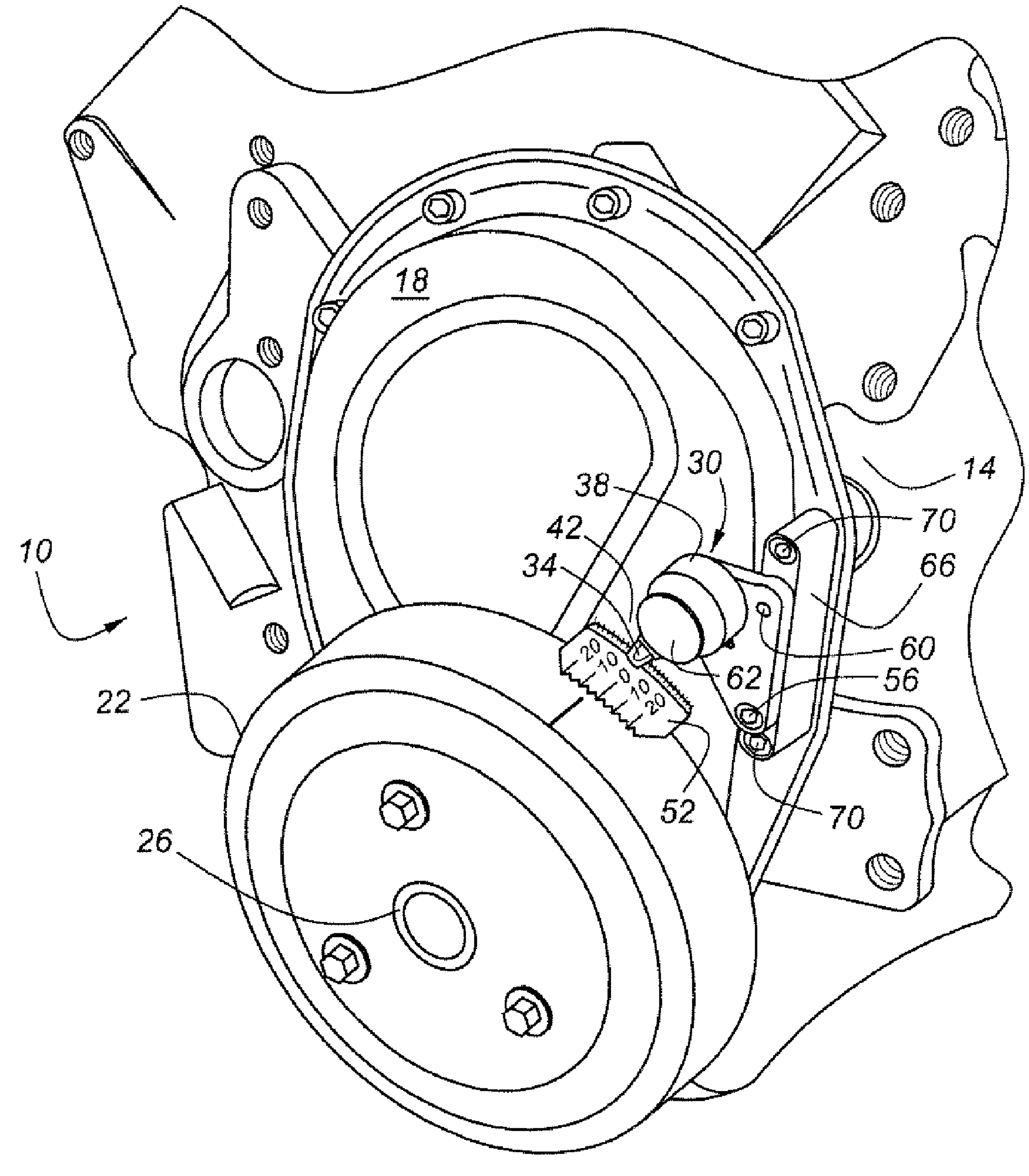
FIG. 5 is a partial perspective view of an engine having a mounted timing device according to another aspect of the present invention.

FIG. 4 also shows a test switch, 82, which may be triggered manually, so as to verify the function of light emitter 34 and its associated energy source. FIG. 4 also shows clearly pointer 46 and pointer base 50. Those skilled in the art will appreciate in view of this disclosure, moreover, that the present timing device could be used not only with the illustrated pointer 46 and degreed damper 22, but also with systems in which only a single timing mark or, perhaps, several timing marks, are scribed onto crankshaft damper 22, with a stationary degreed scale (not shown) being mounted to an exterior surface of engine 10. Such a system is illustrated in FIG. 5. In this case shown in FIG. 5, the stroboscopic illumination provided by switchable light source 30 'freezes' the motion of a mark or line scribed on crankshaft damper 22, allowing the engine's ignition or fuel injection timing to be read from the degrees marked on stationary timing tab 52, which is attached either to timing cover 18 or to another stationary part of engine 10. Pointer 46 and pointer base 42 are not needed with the embodiment of FIG. 5.

From the foregoing description it is easily seen that a vehicle operator wishing to employ the present timing device, need only plug the inductive pickup 72 into housing 38 and attach the pickup to the number 1 sparkplug lead of an engine, so as to obtain an appropriate timing signal. Housing 38 may be detached from base 42 by unscrewing housing 38, allowing the housing to be transferred to another engine.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. A timing device for an internal combustion engine, comprising:

a switchable light source having a light emitter for mounting to an exterior surface of an engine;

an inductive sensor for sensing a firing pulse within a spark plug lead and for providing a switching signal to said switchable light source; and a light guide, mounted to said base, for directing light emanating from said switchable light source.

2. A timing device according to claim 1, wherein said light guide comprises a pin, adjustably attached to said base, for projecting a shadow upon a rotating shaft when said switchable light source is illuminated.

3. A timing device according to claim 1, further comprising a conductor for connecting said switchable light source with a source of electrical energy for powering said light emitter.

4. A timing device according to claim 1, wherein said sensor comprises a pressure sensor for sensing an injection pulse within a fuel injector line.

5. A timing device according to claim 1, wherein said sensor is removably cabled to said switchable light source.

6. A timing device according to claim 1, wherein said light emitter comprises a light emitting diode.

7. A timing device according to claim 1, wherein said light emitter comprises a laser.

8. A timing device according to claim 1, wherein said switchable light source further comprises a housing containing said light emitter and a trigger circuit, with said housing being mounted to a base for securing the housing to an exterior surface of an engine.

9. A timing device according to claim 8, wherein said switchable light source further comprises an energy source contained within said housing.

10. A timing device for an internal combustion engine, comprising:

a switchable light source having a light emitter and a base for mounting the light source on an exterior surface of an engine adjacent to a rotating shaft;

a power source and trigger circuit operatively associated with said light source; and an inductive sensor, operatively connected with the trigger circuit, for sensing a firing pulse within a spark plug lead, and for energizing the switchable light source when a predetermined engine operating condition is detected.

11. A timing device according to claim 10, wherein said light emitter, said power source and said trigger circuit are contained within a housing attached to said base.

12. A timing device according to claim 10, wherein said power source comprises a cable for connecting said light source to a vehicular electrical system.

13. A timing device according to claim 10, wherein said power source comprises at least one battery located within said housing.

14. A timing device according to claim 10, wherein said rotating shaft comprises a crankshaft having a torsional damper with at least one timing mark.

15. A timing device according to claim 10, wherein said rotating shaft comprises a camshaft.

16. An ignition timing device for an internal combustion engine, comprising:

a switchable light source having a light emitter located within a housing, and a base for mounting the housing upon an exterior surface of an engine such that the light emitter is adjacent a crankshaft damper;

a power source and trigger circuit operatively associated with said light emitter, with said power source and trigger circuit being mounted within said housing; and a sensor, connected with the trigger circuit, for energizing the light emitter when a sparkplug firing pulse is detected within a selected sparkplug lead, such that said crankshaft damper will be illuminated stroboscopically by said light emitter, thereby permitting the spark timing of the engine to be determined.

17. A timing device according to claim 16, further comprising a manual test switch for energizing the light emitter.

18. A timing device according to claim 16, wherein said light emitter comprises a light emitting diode.

19. A timing device according to claim 16, wherein said light emitter comprises a laser.

20. A timing device according to claim 16, further comprising a timing tab attached to said engine, and at least one timing mark applied to said crankshaft damper.

* * * * *